(12) United States Patent
Zhang

(10) Patent No.: US 7,397,945 B2
(45) Date of Patent: Jul. 8, 2008

(54) METHOD AND SYSTEM OF IMAGE SEGMENTATION USING REGRESSION CLUSTERING

(75) Inventor: Bin Zhang, Fremont, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 890 days.

(21) Appl. No.: 10/717,739

(22) Filed: Nov. 20, 2003

(65) Prior Publication Data

US 2005/0111730 A1    May 26, 2005

(51) Int. Cl.
*G06K 9/00* (2006.01)
*G06K 9/62* (2006.01)
(52) U.S. Cl. ...................................... 382/164; 382/225
(58) Field of Classification Search ......... 382/162–167, 382/225; 348/256, 240.2; 702/181; 707/7; 250/208.1
See application file for complete search history.

(56) References Cited

U.S. PATENT DOCUMENTS

| 6,720,895 B2 * | 4/2004 | Poulton et al. ............... 341/120 |
| 6,721,003 B1 * | 4/2004 | Tsuruoka et al. ......... 348/240.2 |
| 6,894,262 B2 * | 5/2005 | Gao et al. .................... 382/225 |
| 6,931,350 B2 * | 8/2005 | Zhang ......................... 702/179 |

OTHER PUBLICATIONS

W. S. DeSoto, et al., "A Maximum Likelihood Methodology for Clusterwise Linear Regression," Journal of Classification 5:249-282 (1988).
C. Henning, "Models and Methods for Clusterwise Linear Regression," pp. 1-9. Published 1999.
C. Henning, "Regression Fixed Point Clusters: Motivation, Consistency and Simulations," Feb. 20, 2000, pp. 1-49.

* cited by examiner

*Primary Examiner*—Duy M Dang

(57) ABSTRACT

A processor-based method and a system are provided which are configured to regressively cluster pixels of an image and segment the image based upon the step of regressively clustering.

23 Claims, 3 Drawing Sheets

METHOD AND SYSTEM OF IMAGE SEGMENTATION USING REGRESSION CLUSTERING

BACKGROUND

Background Information

Image segmentation refers to a process of partitioning an image into independent portions. In some cases, the segmentation process may comprise grouping pixels corresponding to particular objects or regions of the image such that the content of the image may be analyzed in more detail and/or objects of the image can be identified. The amount of processing needed to segment an image may be related to the number of pixels included in the image. In particular, segmenting high-resolution images may require a large amount of processing due to the amount of pixels needed to generate the image. In cases in which an image comprises color, the amount of processing needed to segment the image may be additionally or alternatively related to the complexity of the multi-dimensional color space used to characterize the pixels of the image. It would, therefore, be advantageous to develop systems and methods for segmenting images which are capable of processing a large amount of data. It may be particularly beneficial to apply such systems and methods to images of high-resolution and/or images comprising color.

SUMMARY

The problems outlined above may be in large part addressed by a processor-based method and systems which are configured to regressively cluster pixels of an image and segment the image based upon the step of regressively clustering.

BRIEF DESCRIPTION OF THE DRAWINGS

For a detailed description of the exemplary embodiments of the invention, reference will now be made to the accompanying drawings in which.

Figure 1:
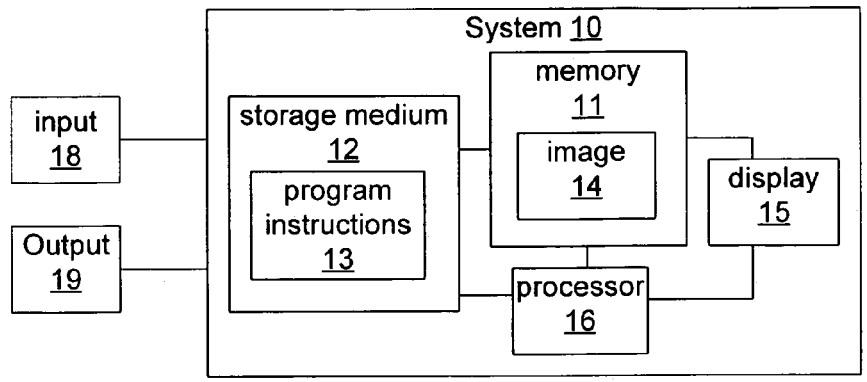
FIG. 1 illustrates a schematic diagram of a system for segmenting an image in accordance with embodiments of the invention.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

NOTATION AND NOMENCLATURE

Certain terms are used throughout the following description and claims to refer to particular system components. As one skilled in the art will appreciate, various companies may refer to a component by different names. This document does not intend to distinguish between components that differ in name but not function. In the following discussion and in the claims, the terms "including" and "comprising" are used in an open-ended fashion, and thus should be interpreted to mean "comprising, but not limited to . . . ." Also, the term "couple" or "couples" is intended to mean either an indirect or direct electrical connection. Thus, if a first device couples to a second device, that connection may be through a direct electrical connection, or through an indirect electrical connection via other devices and connections. In addition, the term, "data mining," as used herein, may refer to the process of identifying and interpreting patterns in databases.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, unless otherwise specified. In addition, one skilled in the art will understand that the following description has broad application, and the discussion of any embodiment is meant only to be exemplary of that embodiment, and not intended to intimate that the scope of the disclosure, is limited to that embodiment.

Figure 2:
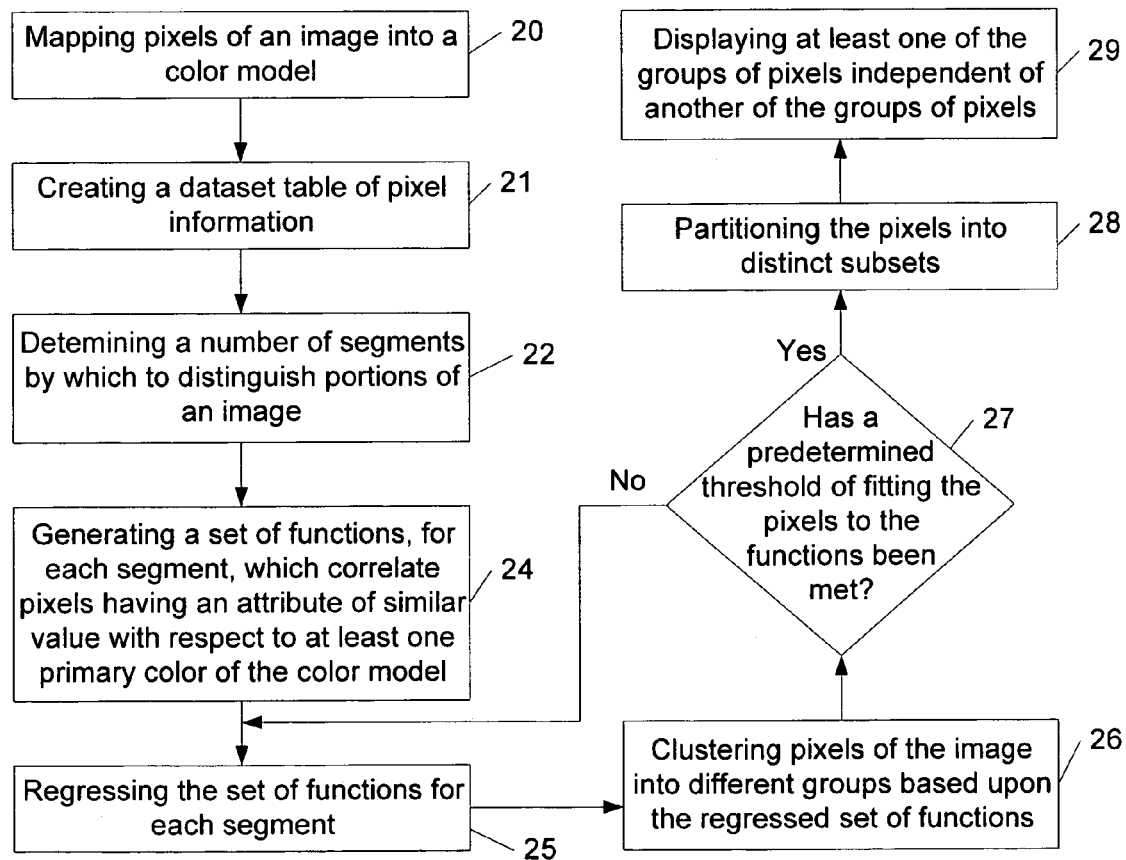
FIG. 2 illustrates a flow chart of a method for segmenting pixels of an image in accordance with embodiments of the invention.
Figure 3:
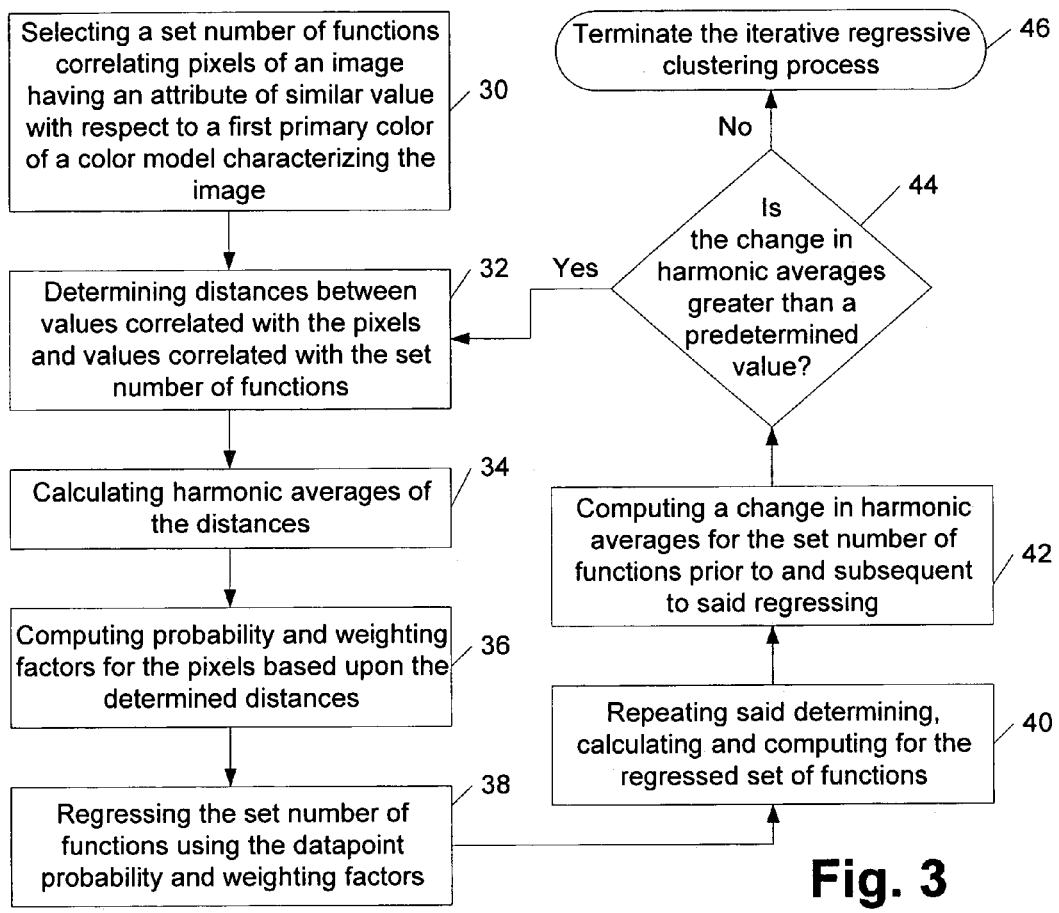
FIG. 3 illustrates a flow chart of an exemplary method for regressively clustering pixels of an image in accordance with embodiments of the invention.

Turning now to the drawings, exemplary embodiments of systems and methods are provided for segmenting an image. More specifically, methods and systems are provided which are configured to iteratively apply a regression algorithm and a clustering performance function on pixels of an image such that the regions and/or objects of the image may be segmented. Such an iterative process may be referred to herein as "regressively clustering" (RC). For example, system 10, shown in FIG. 1, may be configured to regressively cluster pixels of image 14 as described in more detail below. In addition, FIGS. 2 and 3 depict flowcharts of exemplary methods for regressively clustering pixels of an image. FIGS. 4a-4c and FIGS. 5a-5e illustrate exemplary images resulting from the regression clustering processes described in reference to FIGS. 1-3 below. In particular, FIGS. 4b-4c and FIGS. 5b-5e illustrate exemplary image segments regressively clustered from the images depicted in FIGS. 4a and 5a, respectively.

As noted above and described in more detail below, the methods provided herein may comprise the application of one or more algorithms and, therefore, may be best implemented through a computer or, more generally, a system which comprises a microprocessor controller. Consequently, system 10 may be a system which comprises a microprocessor controller. In addition, the methods described herein may, in some embodiments, be referred to as a "computer-implemented methods" or "processor-based methods". In other cases, however, the methods described herein may be referred to as "methods". The use of the terms is not mutually exclusive and, therefore, may be used interchangeably herein.

FIG. 1 depicts system 10 comprising image 14 within memory 11. In some cases, however, system 10 may not comprise an image. As described in more detail below, system 10 may comprise a means to segment an image. System 10, however, does not necessarily need to comprise an image at all times in order to characterize the system to have such an adaptation. In other words, the system provided herein may be described to have an adaptation to segment images stored therein, but does not necessarily need to always store images. For example, in embodiments in which system 10 is a digital camera, the camera may be described to have an adaptation to segment images taken by the camera, but the camera does not necessarily need to have images stored therein at all times.

System 10 may be configured to receive and/or generate images. In particular, system 10 may, in some embodiments, be configured to simulate a pictorial representation of an object or a scene surveyed by system 10. More specifically, system 10 may be configured to gather information pertaining to an object and/or scene through an input port and generate and store an image representative of such an object and/or scene within memory 11. Exemplary systems comprising such an adaptation may comprise, but are not limited to, optical imaging devices, such as static-image and/or video cameras, ultrasonic imaging devices, x-ray imaging devices, magnetic resonance imaging devices and/or ultrasonic imaging devices. In addition or alternatively, system 10 may be configured to receive an image generated from another device. For example, system 10 may comprise a television or a computer system. Other devices may be appropriate for receiving images as well or alternatively, depending on the application of the image.

In some embodiments, the input port used to receive input 18 (i.e., the input used to execute program instructions 13 as described in more detail below) may further be used to receive images generated from another device and/or receive information pertaining to an object or scene to be generated into an image. In yet other embodiments, system 10 may comprise a different input port for the receipt of images and/or such information. In any case, memory 11 may be configured to store any number of images. Consequently, system 10 may, in some embodiments, be configured to select one or more images from memory 11 for processing. The adaptations of system 10 to generate, receive and/or select images may be incorporated into program instructions stored within storage medium 12. In some embodiments, the program instructions used to generate, receive and/or select images may be included within program instructions 13 of storage medium 12. In other cases, the program instructions used to generate, receive and/or select images may be distinct from program instructions 13.

As noted above, system 10 may be configured to regressively cluster image 14. In particular, system 10 may comprise storage medium 12 with program instructions 13 executable by processor 16 to regressively cluster image 14. Storage medium 12 may comprise any device for storing program instructions, such as a read-only memory, a random access memory, a magnetic or optical disk, or a magnetic tape. Program instructions 13 may comprise any instructions that perform the regression clustering and image segmentation processes described below in reference to FIGS. 2 and 3. In particular, program instructions 13 may comprise instructions for regressing a set of functions correlating pixels of an image with respect to a primary color of a color model characterizing the image. In addition, program instructions 13 may comprise instructions for segmenting the image based on the regressed functions. A more detailed description of program instructions 13 are provided below in reference to the process outlined in FIG. 2. System 10 may be configured to receive input 18 such that program instructions 13 may be executed within storage medium 12. In addition, system 10 may be configured generate and transmit output 19. In some cases, output 19 may be transmitted to components within system 10. In other embodiments, however, output 19 may be transmitted to devices separate from system 10.

In some embodiments, it may be advantageous to display portions of image 14 segmented using the regression clustering process described herein. Consequently, system 10 may comprise display 15 in some embodiments. In other embodiments, system 10 may be configured to transmit the images of the segmented portions to a display of a device which is separate from system 10. In yet other cases, system 10 may not be used to display segmented portions of an image. Consequently, the inclusion of display 15 is not necessarily specific to the configuration of system 10 to segment an image. In particular, system 10 does not necessarily need to be able to display an image in order to segment an image. As such, display 15 may be omitted from system 10 in some embodiments.

The regression clustering process described herein may be with respect to primary colors of a color model characterizing the image. A color model, as used herein, may refer to gamut of colors which originate from a set of primary colors. In some embodiments, the color model may be represented as a three-dimensional space bounded by the pure hues of the primary colors. In such a case, each point within the space may represent a different color having a combination of one or more of the primary colors of the color model. Color models may vary by their designation of primary colors and shape of their space. The system and methods described herein may be configured to regressively cluster an image with respect to any color model known in the imaging industry. For example, the system and methods described herein may be configured to regressively cluster pixels of an image with respect to a red-green-blue (RGB) color model, a cyan-magenta-yellow (CMY) color model, a hue-saturation-value (HSV) color model or a hue-lightness-saturation (HLS) color model. Other color models may be used as well or alternatively, depending on the design specifications of the system and/or method.

System 10, discussed in reference to FIG. 1, may be configured to regressively cluster pixels of an image with respect to any number of color models, depending on the design specifications of the system. For example, system 10 may, in some cases, be specifically configured to regressively cluster images with respect to one particular color model. In other embodiments, however, system 10 may be configured to regressively cluster an image with respect to more than one color model. In particular, system 10 may, in some embodiments, comprise different sets of program instructions within storage medium 12 that are individually adapted to regressively cluster pixels of an image with respect to a different color model. In addition, system 10 may be configured to selectively activate one of those sets of program instructions such that an image may be regressively clustered with respect to a particular color model. In some embodiments, such a selectivity adaptation may be in response to user input of selecting the color model. In other cases, the selectivity adaptation may be in response to analyzing the image to determine the color model used to characterize the image. In some embodiments, system 10 may be configured to conduct such an analysis, as described in more detail below in reference to mapping an image.

As noted above, FIG. 2 depicts a flowchart of an exemplary method for segmenting an image. As shown in FIG. 2, the method may comprise block 20 in which pixels of an image are mapped into a color model. Mapping an image into a color model may be referred to herein as the process of assigning color values to pixels of an image that correlate the pixels' hues relative to the points within the three-dimensional space of the color model. For example, mapping a static image from a two-dimensional space into a three-dimensional color space may be represented as:

$$\text{image: } [a,b] \times [c,d] \rightarrow [0,255] \times [0,255] \times [0,255] \quad (1)$$

Video images may also be segmented using the regression clustering process described herein and, therefore, may be mapped into three-dimensional color spaces as well. A video may be referred to as a sequence of images ordered in time. Consequently, mapping a video into a color space may comprise mapping a three-dimensional image (i.e., two dimensions for the images plus one-dimension for time, T) into a three-dimensional color space as outlined in equation (2):

$$\text{video: } [a,b] \times [c,d] \times T \rightarrow [0,255] \times [0,255] \times [0,255] \quad (2)$$

In either case, the [a, b] and [c, d] values of the image may represent the range of points along the horizontal and vertical dimensions of the image. Pixels in the image space may be referenced using such a range of points. In regard to the three-dimensional color space, a pixel may be characterized by three different color values, each with respect to a different primary color of the color model. The [0,255] values of the three-dimensional color space may represent the range of color values for each of the primary colors of the color space, particularly in reference to an 8-bit pixel image. In other words, for each primary color of a color model, one color value from 256 possibilities may be assigned to characterize a pixel of the image with respect to each of the primary colors. Although, the range of 256 possibilities for color values of the color model pertains to an 8-bit pixel image, larger or smaller images may be mapped and segmented using the system and methods described herein. In particular, 4-bit, 16-bit and 32-bit images may be mapped and segmented using the regression clustering techniques described herein. Consequently, a larger or smaller number of color value possibilities may be used to characterize pixels of an image, depending on the bit size of the image.

In some embodiments, the process of mapping an image to a color model may be incorporated into the generation of the image. For example, in embodiments in which system 10 is configured to generate an image, block 20 may be incorporated into such an adaptation. Alternatively, an image may be mapped to a color model within system 10 subsequent to being created, regardless of whether the image is generated by system 10. In some cases, block 20 may comprise initializing the characterization of an image into a color model. Alternatively stated, block 20 may, in some embodiments, comprise mapping an image which was not previously characterized by a color model. In other embodiments, block 20 may comprise converting a color model characterizing an image into an alternative color model. In yet other cases, block 20 may not be included within the method. In particular, the method described herein may be used to segment an image which is already characterized within a color model. The omission of such a mapping step may be particularly applicable in cases in which system 10 is used to receive an image instead of generating the image therein. In any case, system 10 may comprise adaptations to facilitate any and/or all of the different functions described in reference to block 20. As such, system 10 may be configured to initialize the characterization of an image into a color model and/or covert a color model characterization of an image as well as receive and/or generate an image characterized by a color model.

In any case, the method may further include block 21 in which a dataset table of pixel information may be created. The process of creating a dataset table may be different for static and video images. In particular, creating a dataset table for a static image may include extracting x and y coordinates for some or all of the pixels as well as one or more attribute values associated with the color model characterizing the static image. Creating a dataset table for a video image, on the other hand, may include choosing one attribute associated with the color model characterizing the video image and extracting the x and y coordinates of pixels having a value for such a chosen attribute. Time may also be filed within the dataset table attributed with a video image such that an estimation of motion may be determined. In any case, the dataset table created in block 21 may be used to generate a set of functions representing the pixels as described in more detail below in reference to block 24.

As shown in FIG. 2, the method may further comprise block 22 in which a number of segments by which to distinguish portions of an image are determined. In some embodiments, the number by which to distinguish portions of an image may be determined by user-input. In other cases, however, the image may be analyzed to determine such a number. In either case, block 22 may be conducted through program instructions 13 of system 10. As noted above, FIGS. 4a-4c and FIGS. 5a-5e illustrate exemplary images resulting from the regression clustering processes described herein. Such illustrations may be used to describe the determination of the number of segments by which to distinguish portions of an image as outlined in block 22.

Figure 4A:
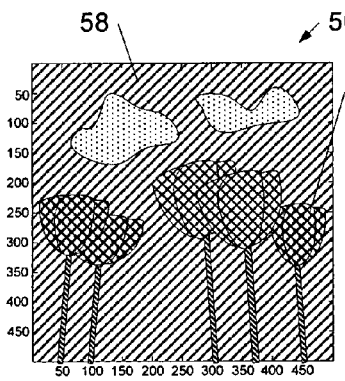
FIG. 4a illustrates an illustration of an image having flowers in the forefront of a sky in accordance with embodiments of the invention.
Figure 4B:
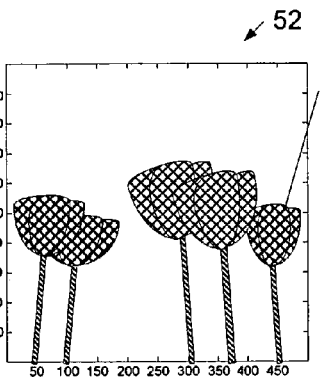
FIG. 4b illustrates a segmentation of the image in FIG. 4a comprising the flowers in accordance with embodiments of the invention.
Figure 4C:
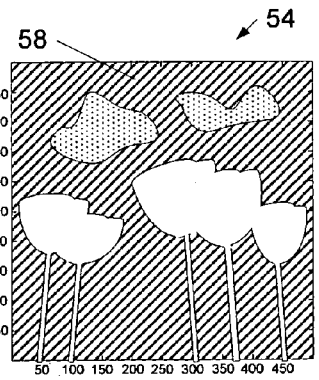
FIG. 4c illustrates a segmentation of the image in FIG. 4a comprising the sky in accordance with embodiments of the invention.

As shown in FIG. 4a, image 50 comprises flowers 56 in the forefront of sky 58. FIGS. 4b and 4c illustrate segmented portions of image 50. More specifically, FIG. 4b illustrates segmented image 52 with flowers 56 and absent of sky 58 and FIG. 4c illustrates segmented image 54 with sky 58 and absent of flowers 56. In such embodiments, two segments have been selected to distinguish portions of image 50. A larger number of segments, however, may be used to segment image 50 in some embodiments. In addition, image 50 may be segmented in manners other than those depicted in FIGS. 4b and 4c. In particular, a portion of flowers 50, such as the stems or petals, may be segmented from image 50 in some embodiments. In addition or alternatively, a portion of sky 58, such as the clouds or cloudless portions of sky 58, may be segmented from the image.

Moreover, not all portions of image 50 may need to be segmented. In particular, image 50 may be segmented into a set number of distinct portions without comprising every feature of the image within the segmented images. For example, portions of flowers 58 may be segmented from image 50 without having sky 58 segmented therefrom. In addition, although FIGS. 4b and 4c display each of the segmented images from images 50, each of the segmented images therefrom may not need to be displayed. In any case, segmenting objects or portions of objects within image 50 may be referred to herein as object-segmentation. In some cases, image 50 may be segmented by regions as well as by objects. In particular, image 50 may be segmented into a particular number of regions and pixels within one or more of the regions may be regressively clustered to segment portions of the image within such regions. In such embodiments, image 50 may be segmented into any number of regions.

As described above, the segmentation of pixels within images may be with respect to a color model characterizing the image. More specifically, pixels of an image may be clustered into different groups based on their color values. In some embodiments, the segmentation of color values may be with respect to a broad variation of colors within the image. In particular, the segmentation of pixels within an image or a region of an image may be with respect to the pixels' color values varying by more than a predetermined amount such that the colors of the segmented pixels are recognized as distinct colors. For example, in reference to FIGS. 4a-4c, colors with the hues of yellow and green may be segmented as flower 56 and hues of blue and white may be segmented as sky 58. In other cases, however, pixels may be more discriminately segmented such that different hues of the same color may be separated into different groups. In other words, pixels having color values which vary by less than the predetermined amount used in the broad color variation segmentation technique may be segmented. In this manner, objects or portions of objects within an image which are characterized by different shades of a similar color may be segmented. In any case, pixels of an image may, in some embodiments, be regressively clustered with respect to one or more of the primary colors of the color model characterizing the image as described in more detail below in reference to blocks 24-27 of FIG. 2.

Figure 5A:
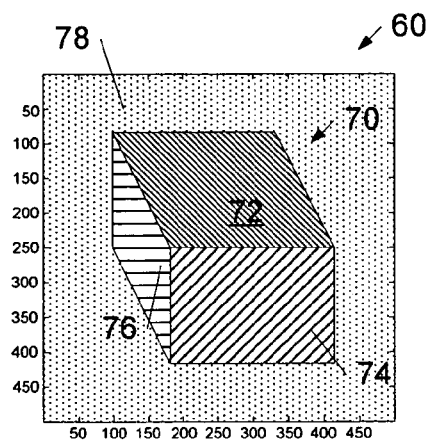
FIG. 5a illustrates an illustration of another image having box in the forefront of a background in accordance with embodiments of the invention.
Figure 5B:
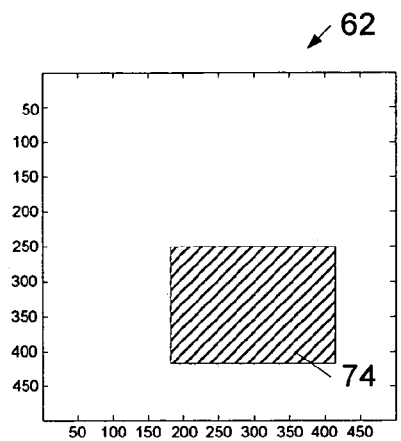
FIG. 5b illustrates a segmentation of the image in FIG. 5a comprising the front surface of the box in accordance with embodiments of the invention.
Figure 5C:
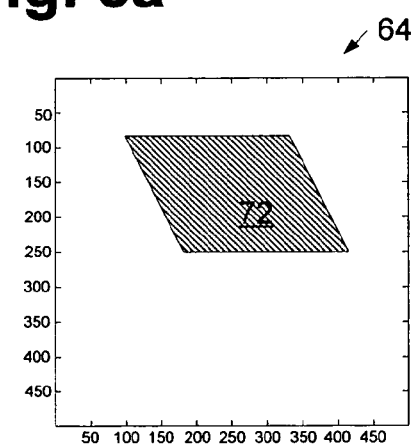
FIG. 5c illustrates a segmentation of the image in FIG. 5a comprising the top surface of the box in accordance with embodiments of the invention.

A different exemplary illustration of segmenting an image into distinguished portions in shown in FIGS. 5a-5e. In particular, FIG. 5a illustrates image 60 with box 70 in the forefront of background 78. As shown in FIG. 5a, box 70 may comprise sides 72, 74 and 76. In some embodiments, sides 72, 74 and 76 may each comprise a distinct color and, therefore, may be segmented from each other using the broad color variation technique described above. In other cases, sides 72, 74 and 76 may comprise substantially similar colors differentiating from each other by small color value variations. In such embodiments, sides 72, 74 and 76 may comprise hues of the same main color and, sometimes, the same primary color of a color model characterizing image 60. In any case, sides 72, 74 and 76 are illustrated in FIG. 5a as having different cross-hatch patterns to emphasize the distinction between the different sides of box 70, regardless of whether they are distinguished by distinct colors or different hues of the same color. Consequently, sides 72, 74 and 76 may not necessarily comprise such patterns in some embodiments.

Figure 5D:
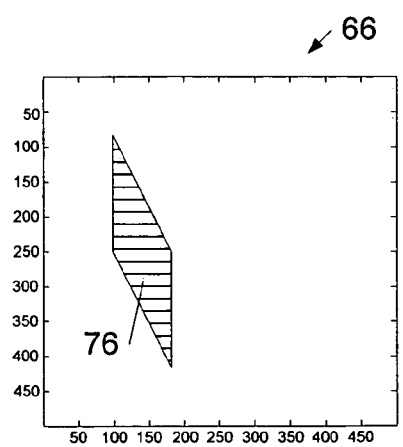
FIG. 5d illustrates a segmentation of the image in FIG. 5a comprising the side surface of the box in accordance with embodiments of the invention.
Figure 5E:
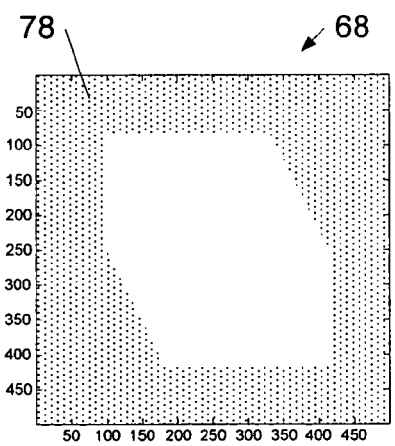
FIG. 5e illustrates a segmentation of the image in FIG. 5a comprising the background in accordance with embodiments of the invention.

In some embodiments, it may be advantageous to segment the portions of box 70 relative to the color of sides 72, 74 and 76. As shown in segmented image 62 of FIG. 5b, side 72 may, in some embodiments, be segmented from image 60. In addition or alternatively, side 74 may be segmented from image 60 as shown in segmented image 64 in FIG. 5c. FIG. 5d illustrates segmented image 66 with side 76 illustrated and all other portions of image 60 absent. FIG. 5e illustrates segmented image 68 having background 78 segmented from image 60. As with image 50 in FIG. 4a, image 60 may be segmented in other manners than the segmented images illustrated in FIGS. 5b-5e. In particular, image 60 may be segmented relative to different portions of box 70, such as the front or back half of the box, for example. In addition or alternatively, regions of image 60 may be segmented. Moreover, not all portions of image 60 may need to be segmented. In particular, image 60 may be segmented into a set number of distinct portions without comprising every object of the image within the segmented images. In addition, although FIGS. 5b-5e display each of the segmented images from images 60, each of the segmented images therefrom may not need to be displayed.

Turning back to FIG. 2, the method for segmenting an image may comprise block 24 in which a set of different functions is generated for each segment determined in block 22. As noted above, pixels of an image may be regressively clustered with respect to one or more primary colors of the color model characterizing the image. In other words, pixels of an image may be regressively clustered with respect to the color values associated with one of the primary colors used to characterize the pixels. For example, in embodiments in which an RGB color model is used to characterize an image, a different set of functions may be generated with respect to one or more of the individual primary colors of red, green and blue. In embodiments in which an CMY color model is used to characterize an image, a different set of functions may be generated with respect to one or more of the individual primary colors of cyan, magenta and yellow.

In any case, block 24 may comprise generating a set number of functions, K, from a family of functions, a, correlating pixels of an image having an attribute of similar value relative to at least one primary color of a color model characterizing the image. In some embodiments, the attribute may comprise the brightness, hue or saturation of the primary color within the pixel. In other embodiments, the attribute may comprise the degree at which the primary color changes from pixel to pixel. In any case, K functions may be selected randomly or by any heuristics that are believed to give a good start. The determination of the optimum K may comprise techniques used in the data mining industry for clustering.

The partition of pixels within an image can be "hard" or "soft." A "hard" partition may refer to the designation of every pixel within an image belonging to a particular group or cluster of pixels. In this manner, the partitions of the pixels may be clear and distinct. Such a hard-partitioning of pixels is employed by the K-Means regression clustering method as described in more detail below. A "soft" partition, however, may refer to the ambiguous groupings of pixels within clusters of an image. In some cases, such a categorization of pixels may depend on the probability of the pixels belonging to particular clusters within the image rather than other clusters. In this manner, although the clustering of pixels within an image using "soft-partitioning" techniques are generally ambiguous, portions of the image may be segmented by determining the probability of pixels belonging to a particular groups of pixels. Soft-partitioning of pixels may be employed by the K-Harmonic Means and Expectation Maximization regression clustering methods as described in more detail below.

As shown in FIG. 2, the method of segmenting an image may further comprise block 25 in which the sets of functions generated in block 24 are regressed. In addition, the method may comprise block 26 in which pixels of the image are clustered into different groups based upon the regressed sets of functions. Such a clustering process may serve to segment pixels of the image such that the segments may be analyzed and identified. A more detailed description of such regression and clustering processes are provided below. As shown in FIG. 2, the method may continue to block 27 in which a determination is made as to whether a predetermined threshold of fitting the pixels into the regressed functions has been met. In embodiments in which the predetermined threshold has not been met, the method may return to block 25 to repeat the regressing and clustering processes. In this manner, the method offers an iterative process of regressively clustering the pixels of the image.

In embodiments in which the predetermined threshold has been met, the method may continue to block 28 as shown in FIG. 2. Block 28 specifies the partitioning of the pixels into distinct subsets. Such a process is used to link the results of the regression clustering process described in reference to blocks 24-27 back to the image such that portions of the image may be segmented. Such a partitioning process may differ for static and video images. In particular, pixels associated with a static image may be assigned to functions to which they most closely fit such that the pixels are partitioned in distinct segments. The partitioning process for video images may include designating each of the functions regressed in block 25 to represent a particular motion path in the sequence of video images. In particular, block 28 may include partitioning the pixels to follow:

$$(x,y) = (f_{k,x}(t), f_{k,y}(t)), k=1, \ldots, K \quad (3)$$

As shown in FIG. 2, the method may continue to block 29 in some embodiments. In particular, at least one of the groups of pixels may be displayed independent of another of the groups of pixels in some cases. In this manner, one or more segmented images may be analyzed independent of other objects within the image. In some embodiments, each of the groups of pixels may be displayed independent of the other groups of pixels as shown in the series of images illustrated in FIGS. 4b-4c and FIGS. 5a-5e. In other embodiments, a plurality of the groups of pixels may be displayed together. In yet other embodiments, the method may not comprise displaying the segmented images and, consequently, block 29 may be omitted. In any case, the method may, in some embodiments, further comprise processing the image subsequent to block 27. In particular, the method may comprise interpolating, compressing or further segmenting the image.

Any regression clustering technique may be used to conduct the processes of blocks 25 and 26. Such regression clustering techniques may comprise applying K functions, M (where $M = \{f_1, \ldots, f_K\} \subset \Phi$), to the image, finding its own partition of pixels, $Z_k$, and regressing on the partition. The K regression functions are not necessarily linear. Both parts of the process, i.e., the K regressions and the partitioning of the pixels of the image, optimize a common objective function. Methods which are specifically configured to employ an Expectation Maximization (EM) objective function, a K-Means (KM) objective function and a K-Harmonic Means (KHM) objective function to regressively cluster an image are provide herein. Other objective functions may be used as well or alternatively to regressively cluster pixels of an image. Consequently, although an exemplary method for performing regression clustering using a K-Harmonic Means objective function is illustrated in the flowchart of FIG. 3 and discussed in more detail below, the system and methods described herein are not restricted to using such a method for regressively clustering images.

The method of regression clustering using a K-Means objective function (referred to herein as RC-KM) solves the following optimization problem:

$$\min_{\{f_k\} \subset \Phi, \{Z_k\}} \mathrm{Perf}_{RC\text{-}KM} = \sum_{k=1}^{K} \sum_{(x_i, y_i) \in Z_k} e(f_k(x_i), y_i) \quad (4)$$

where Z represents a set of pixels with color values x and y (i.e., $Z = (X, Y) = \{(x_i, y_i) | i = 1, \ldots, N\}$) and $Z = \cup_{k=1}^{K} Z_k$ ($Z_k \cap Z_{k'} = \emptyset, k \neq k'$). The optimal partition will satisfy:

$$Z_k = \{(x,y) \in Z | e(f_k^{opt}(x), y) \leq e(f_{k'}^{opt}(x), y) \cdot \forall k' \neq k\}, \quad (5)$$

which allows the replacement of the function in optimization problem (2) to result in:

$$\mathrm{Perf}_{RC\text{-}KM}(Z, \{f_k\}_{k=1}^{K}) = \sum_{i=1}^{N} \mathrm{MIN}\{e(f_k(x_i), y_i) | k = 1, \ldots, K\}. \quad (6)$$

In other words, RC-KM determines an optimal clustering of pixels by regressing functional relationships of the pixels to have a minimum amount of total variation or error (e).

The process of RC-KM may be executed through a monotone-convergent algorithm to find a local optimum of equation (4). One example of an RC-KM algorithm may comprise a first set of instructions for picking a set number of functions, K, to correlate pixels within the image as described above. In addition to selecting K number of functions, the RC-KM algorithm may comprise a second set of instructions for repartitioning the pixels in the r-th iteration, $r = 1, 2, \ldots$, as:

$$Z_k^{(r)} = \{(x,y) \in Z | e(f_k^{(r-1)}(x), y) \leq e(f_{k'}^{(r-1)}(x), y) \forall k' \neq k\}. \quad (7)$$

Such a repartitioning process facilitates a "hard" partition, as defined above. Each pixel within the image may be associated with the regression function that results in the smallest approximation error. Using the RC-KM algorithm, distances between values correlated with each of the pixels and values correlated with the regression functions may be determined and the errors of fitting the pixels to the functions are compared. Algorithmically, for $r > 1$, a pixel in $Z_k^{(r-1)}$ is moved to $Z_{k'}(r)$ if and only if:

a) $e(f_{k'}^{(r-1)}(x), y) < e(f_k^{(r-1)}(x), y)$ and
b) $e(f_{k''}^{(r-1)}(x), y) \leq e(f_k^{(r-1)}(x), y)$ for all $k'' \neq k, k'$.

$Z_k^{(r)}$ inherits all the pixels in $Z_k^{(r-1)}$ that are not moved. In the event of a tie between the error functions, the pixels may be randomly grouped in either subset.

In addition to program instructions for function selection and clustering, the RC-KM algorithm may comprise a third set of program instructions for running a regression optimization algorithm. In particular, the third set of instructions may comprise an algorithm by which to alter the selected functions to more closely represent the pixels within the respective partitions. In some cases, variable selections for the K regressions can be done on each partition independently with the understanding that an increase in the value of the objective function could be caused by such a process. In any case, the third set of program instructions may comprise any regression optimization algorithm that results in the following:

$$f_k^{(r)} = \arg\min_{f \in \Phi} \sum_{(x_i, y_i) \in Z_k} e(f(x_i), y_i) \quad (8)$$

where $k = 1, \ldots, K$. In some embodiments, regularization techniques may be employed to prevent over-fitting of the converged results from the regression algorithm. In addition or alternatively, boosting techniques may be used on each partition independently to improve the quality of the converged results within each partition. In any case, the regression algorithm may be selected by the nature of the original problem or other criteria. The fact that it is included in a regression clustering process adds no additional constraint on its selection.

In order to cluster the data into the optimum partitions, the second and third set of instructions of the RC-KM algorithm may be conducted repeatedly. Optimally, such a reiterative process continues until there are no more pixels changing their membership within the partitions. Such a determination of membership change may serve as a predetermined threshold of fitting the pixels to the functions as described in reference to block 27. If any pixel does change its partition membership as a result of the second and third sets of instructions, the value of the objective function in equation (4) decreases. Consequently, the value of the objective function in equation (4) continues to decrease with each membership change. As a result, the RC-KM algorithm stops in finite number of iterations.

As noted above, some clustering techniques, such as K-Means clustering methods, may be sensitive to the initialization of partition centers. Similarly, RC-KM may be sensitive to the initialization of its K functions. More specifically, the convergence of pixels into clusters using RC-KM may depend on how closely the initial set of K functions represent the pixels, since the pixels are partitioned into distinct subsets (i.e., hard partitioned) with respect to the selected functions during each iteration of the algorithm. The initialization of the K functions may be dependent on the amount of and quality of available prior information. In many instances, however, there is minimal or no prior information available regarding the functional relationship between pixels. In some cases, more than one functional relationship may be found to represent a partition of pixels. As a result, convergence to a distinct set of partitions may be difficult using RC-KM techniques. In other cases, however, the initialization of the K functions using RC-KM may be good and, as a result, pixels may be clustered into an optimum set of partitions using an RC-KM algorithm.

In contrast to K-Means clustering techniques, K-Harmonic Means (KHM) clustering algorithms are generally less sensitive to the initialization of the K functions due to KHM's methods of dynamically weighting pixels and its "soft" partitioning scheme. Similar to KHM clustering, the K-Harmonic Means regression clustering process (RC-KHM$_p$) described herein is generally less sensitive to the initialization of the K functions as discussed in more detail below. RC-KHM$_p$'s objective function is defined by replacing the MINO function in equation (6) by the harmonic average function, HA( ). In addition, the error function may be represented as $e(f_k(x_i),y_i)=\|f_k(x_i)-y_i\|^p$, where $p \geq 2$. As a result, the objective function of RC-KHM$_p$ may be:

$$Perf_{RC-KHM_p}(Z, M) = \sum_{i=1}^{N} HA_{1 \leq k \leq K}\{\|f_k(x_i) - y_i\|^p\} \quad (9)$$

$$= \sum_{i=1}^{N} \frac{K}{\sum_{k=1}^{K} \frac{1}{\|f_k(x_i) - y_i\|^p}}$$

Different values of parameter p may represent different distance functions.

An exemplary method of K-Harmonic Means regression clustering is depicted in the flowchart of FIG. 3. Such a method is described herein in reference to an exemplary algorithm for RC-KHM$_p$. As with RC-KM, RC-KHM$_p$ may be employed through an algorithm which comprises a first set of instructions for selecting a set number of K functions randomly or by any heuristics. Such a process is noted as block 30 in FIG. 3. As noted above, the selected functions may correlate pixels of an image. In contrast to the hard partitioning used in RC-HM, RC-KHM$_p$ uses a soft partitioning scheme. Consequently, pixels may not be distinctly associated with a single function when using an RC-KHM$_p$ algorithm. Rather, the RC-KHM$_p$ process may comprise determining the distances between values correlated with the pixels and values correlated with the functions and computing probability and weighting factors associated with such distances for each of the pixels as noted in blocks 32 and 36 in the flowchart of FIG. 2, respectively. In turn, the RC-KHM$_p$ algorithm may comprise a second set of instructions to determine approximate associations of the pixels to the K functions based upon the probability and weighting factors. The calculation of the harmonic averages noted in block 34 may be used in the objective function of RC-KHM$_p$ as noted in equation (9) above and explained in more detail below.

The probability of the i-th data point belonging to a particular k function may be computed as:

$$p(Z_k \mid z_i) = d_{i,k}^{p+q} \Big/ \sum_{l=1}^{K} d_{i,l}^{p+q}. \quad (10)$$

wherein:

$$d_{i,k} = \|f_k^{(r-1)}(x_i) - y_i\|. \quad (11)$$

The parameter q may be used to put the regression's error function as noted in equation (13) below in $L^q$-space. In addition, the parameter q may be used to reduce the association of pixels to more than one of the selected K functions. In any case, the weighting factor for each pixel may be computed using (i.e., each pixel's participation may be weighted by):

$$a_p(z_i) = \sum_{l=1}^{K} d_{i,l}^{p+q} \Big/ \sum_{l=1}^{K} d_{i,l}^{p}. \quad (12)$$

In this manner, not all pixels fully participate in all iterations in RC-KHM$_p$ like in RC-KM.

As shown in equation (12), the value of weighting function $a_p(z_i)$ for a particular pixel may be closely related to the distance between the color value of the pixel and the function. In particular, the value of weight function $a_p(z_i)$ is smaller when the color value of the pixel is closer to the function than if the color value pixel is farther away from the function. Weighting function $a_p(z_i)$ changes in each iteration as the regression functions are updated and, thus, is dynamic. As described above in reference to RC-KM and will be described below in reference to RC-EM, the participation of each pixel is not weighted. As such, $a_p(z_i)$ is equal to 1 in RC-KM and RC-EM.

As shown in block 38 in the flowchart of FIG. 3, the RC-KHM$_p$ process may comprise regressing K function using the probability and weight factors computed in block 36. In particular, the RC-KHM$_p$ process may run any regression optimization algorithm that results in:

$$f_k^{(r)} = \arg\min_{f \in \Phi} \sum_{i=1}^{N} a_p(z_i) p(Z_k | z_i) \| f(x_i) - y_i \|^q \quad (13)$$

where k=, ..., K. For simpler notations, $p(Z_k|z_i)$ and $a_p(z_i)$ are not indexed in equation (11) by q or p. In addition, $d_{i,k}$, $p(Z_k|z_i)$, and $a_p(z_i)$ in equations (10), (11), (12) and (13) are not indexed by the iteration r to simplify notations. As in RC-KM, variable selections for the K regressions in RC-KHM$_p$ can be done on each partition independently with the understanding that an increase in the value of the objective function could be caused by such a process. In addition, regularization techniques and/or boosting techniques may be employed to improve the quality of the converged results. In any case, the regression algorithm may be selected by the nature of the original problem or other criteria. The fact that it is included in a regression clustering process adds no additional constraint on its selection.

Block 40 comprises the reiteration of blocks 34, 36 and 38 for the regressed set of functions. More specifically, the RC-KHM$_p$ process involves determining the distances between values correlated with each of the pixels and values correlated with the regressed functions, calculating harmonic averages of such distances and computing probability and weighting factors for the pixels based upon the determined distances. Continuing to block 42, the RC-KHM$_p$ process may comprise computing a change in harmonic averages for the K functions prior to and subsequent to the regressing process described in reference to block 38. Such a computation may be included within the objective function for RC-KHM$_p$ as cited in equation (7) above. Block 44 may be used to determine if the change in harmonic averages is greater than a predetermined value. More specifically, since there is no discrete membership change in RC-KHM$_p$, the continuation or termination of the method may be determined by measuring the changes to the RC-KHM$_p$ objective function (i.e., equation (7)). In this manner, the process of block 44 may correspond to the process described in reference to block 27 of FIG. 2 in which a determination is made as to whether a threshold of fitting pixels to the functions has been met.

As shown in FIG. 3, in embodiments in which the change in harmonic average (i.e., the objective function) is greater than the predetermined value, the method may revert back to block 32 and determine distances between values correlated to the pixels and the values correlated with the functions. The method may subsequently follow the flow blocks 34-44 and, thus, provides an iterative process until the change in harmonic averages is reduced to a value below the predetermined level noted in block 44. As shown in FIG. 3, upon determining the change in harmonic averages (i.e., the objective function) is less than the predetermined value, the method may terminate. In particular, when the change in the objective function is less than a predetermined value, the method may stop. Alternatively, the method may be terminated when value of the objective function is less than a predetermined value.

Referring to an RC-EM process, the objective function is defined as:

$$\mathrm{Perf}_{RC\text{-}EM}(Z, M) = \qquad (14)$$

$$-\log\left\{\prod_{i=1}^{N}\sum_{k=1}^{K}\frac{p_k}{\sqrt{(2\pi)^d |\Sigma_k|}} \mathrm{EXP}\left(-\frac{1}{2}(f_k(x_i) - y_i)\Sigma_k^{-1}(f_k(x_i) - y_i)^T\right)\right\}$$

where d=dimension (Y). In the case in which d=1, $(f_k(x_i)-y_i)$ is a real number and $\Sigma_k^{-1}=1/\sigma_k^2$. An exemplary RC-EM algorithm may comprise a first set of instructions to select a set number of K functions, as described in reference to block 24 of FIG. 2. In addition to function selection, the RC-EM algorithm may comprise two steps by which to regressively cluster a dataset. In particular, the RC-EM algorithm may comprise an expectation step (E-Step) and a maximization step (M-Step). The E-Step may be used to determine how much of each pixel is related to each cluster of pixels. Such a step may be conducted by computing a probability factor in which:

$$p(Z_k^{(r)} | z_i) = \qquad (15)$$

$$\frac{\frac{p_k^{(r-1)}}{\sqrt{|\Sigma_k|}} \mathrm{EXP}\left(-\frac{1}{2}(f_k^{(r-1)}(x_i) - y_i)\Sigma_{r-1,k}^{-1}(f_k^{(r-1)}(x_i) - y_i)^T\right)}{\sum_{k=1}^{K} \frac{p_k^{(r-1)}}{\sqrt{|\Sigma_k|}} \mathrm{EXP}\left(-\frac{1}{2}(f_k^{(r-1)}(x_i) - y_i)\Sigma_{r-1,k}^{-1}(f_k^{(r-1)}(x_i) - y_i)^T\right)}$$

The M-Step may use such a probability factor to regress the selected functions of the dataset. In particular, the M-step may use the following equations to regress the functions of a dataset:

$$p_k^{(r)} = \frac{1}{N}\sum_{i=1}^{N} p(Z_k^{(r)} | z_i) \qquad (16)$$

$$f_k^{(r)} = \arg\min_{f \in \Phi}\sum_{i=1}^{N} p(Z_k^{(r)}, z_i)\| f(x_i) - y_i\|^2 \qquad (17)$$

$$\Sigma_{r,k} = \frac{\sum_{i=1}^{N} p(Z_k^{(r)} | z_i)(f_k^{(r)}(x_i) - y_i)^T(f_k^{(r)}(x_i) - y_i)}{N * p_k^{(r)}} \qquad (18)$$

The E-Step and M-Step may be conducted in an iterative process. As with RC-KM, RC-EM may be sensitive to the initialization of functions and, consequently, may have difficultly in converging the pixels in an optimal set of subsets in some embodiments. In other cases, however, the initialization of functions may be good and the pixels may be clustered into an optimum set of partitions using an RC-EM algorithm.

The above discussion is meant to be illustrative of the principles and various embodiments of the present invention. Numerous variations and modifications will become apparent to those skilled in the art once the above disclosure is fully appreciated. For example, the systems and methods described herein may be incorporated within any type of system configured to generate and/or receive an image, such as static-image and video cameras, televisions, computers, web sites, ultrasonic imaging devices, x-ray imaging devices, magnetic resonance imaging devices and ultrasonic imaging devices.

In addition, the regression clustering technique of segmenting an image as described herein may be applied to both static and video images. It is intended that the following claims be interpreted to embrace all such variations and modifications.

What is claimed is:

1. A processor-based method, comprising:
regressively clustering pixels of an image with respect to a color model characterizing the image by regressing functions that correlate pixels having an attribute of similar value with respect to a first primary color of the color model and clustering pixels of the image into distinct groups based upon the regressed functions; and
segmenting the image based upon said regressively clustering such that retrievable segments are formed within a memory coupled to a micro-processor conducting the processor-based method.

2. The processor-based method of claim 1, wherein said attribute comprises brightness.

3. The processor-based method of claim 1, wherein said attribute comprises a degree at which the first primary color changes from pixel to pixel.

4. The processor-based method of claim 1, wherein said regressively clustering further comprises regressing functions which each correlate pixels having an attribute of similar value with respect to a second primary color of the color model.

5. The processor-based method of claim 4, wherein said regressively clustering further comprises regressing functions which each correlate pixels having an attribute of similar value with respect to a third primary color of the color model.

6. The processor-based method of claim 5, wherein said clustering comprises clustering the pixels based upon the regressed functions of the first, second and third primary colors.

7. The processor-based method of claim 1, further comprising mapping the pixels of the image into a three-dimensional color space prior to said regressively clustering the pixels.

8. The processor-based method of claim 7, wherein said mapping the pixels is with respect to time.

9. The processor-based method of claim 1, further comprising displaying at least one of the image segments independent of another of the image segments.

10. A tangible computer readable storage medium having instructions for causing a computer to execute a method, comprising:
determining a number of segments by which to distinguish portions of an image;
generating a set of functions, for each segment, that correlate pixels of the image having an attribute of similar value relative to a color model, wherein each of the set of functions is based relative to a different primary color of the color model characterizing the image;
regressing, for each segment, the set of functions; clustering pixels of the image into different groups based upon the regressed sets of functions; and
repeating said regressing and said clustering sequentially.

11. The tangible computer readable storage medium of claim 10 having instructions for causing the computer to execute the method that further comprises:
partitioning pixels into distinct subsets prior to said regressing; and
re-partitioning the pixels into the distinct subsets subsequent to said regressing.

12. The tangible computer readable storage medium of claim 11 having instructions for causing the computer to execute the method that further comprises, terminating said repeating when a partition of pixels within the subsets does not change from said, partitioning to said re-partitioning.

13. The tangible computer readable storage medium of claim 10 having instructions for causing the computer to execute the method that further comprises:
determining probability factors of the pixels correlating to the functions, wherein the program instructions for regressing comprises program instructions for regressing the functions using the probability factors; and
soft-partitioning the pixels into the different groups based upon the regressed functions.

14. A system, comprising:
an input port configured to receive an image; and
a processor configured to: regress functions that correlate pixels of the image having an attribute of similar value relative to a color model, the functions being regressed with respect to different primary colors of the color model characterizing the image;
cluster the pixels into distinct segments using the regressed functions; and
reiterate said regress and cluster.

15. The system of claim 14, wherein the processor is further configured to map the pixels into the color model.

16. The system of claim 14, wherein the input port is configured to receive a static image.

17. The system of claim 14, wherein the input port is configured to receive a video image.

18. The system of claim 14 further comprising a display device configured to display the image and the distinct segments.

19. A system, comprising:
a first means to receive an image; and
a second means for regressively clustering pixels of the image with respect to a color model characterizing the image to produce distinct segmentations of the image by regressing functions that correlate pixels having an attribute of similar value with respect to a first primary color of the color model and clustering pixels of the image into distinct groups based upon the regressed functions.

20. The system of claim 19, further comprising a third means to characterize the pixels into a three-dimensional color space.

21. The system of claim 19, wherein the third means is configured to characterize the pixels into a red-green-blue color space.

22. The system of claim 19, wherein the third means is configured to characterize the pixels into a cyan-magenta-yellow color space.

23. The system of claim 19, wherein the third means is configured to characterize the pixels into the three-dimension color space with respect to time.

* * * * *

UNITED STATES PATENT AND TRADEMARK OFFICE
CERTIFICATE OF CORRECTION

PATENT NO.         : 7,397,945 B2                                    Page 1 of 1
APPLICATION NO.    : 10/717739
DATED              : July 8, 2008
INVENTOR(S)        : Bin Zhang It is certified that error appears in the above-identified patent and that said Letters Patent is hereby corrected as shown below:

In column 8, line 25, delete "a" and insert -- $\phi$ --, therefor.

In column 10, line 36, delete "$Z_k(r)$" and insert -- $Z_{k'}^{(r)}$ --, therefor.

In column 10, line 37, delete "$e(f_k^{(r-1)}(x),y)<e$" and insert -- $e(f_{k'}^{(r-1)}(x),y)<e$ --, therefor.

In column 10, line 38, delete "$\leq e(f_k^{(r-1)}(x),y)$" and insert -- $\leq e(f_{k'}^{(r-1)}(x),y)$ --, therefor.

Signed and Sealed this

Twenty-eighth Day of April, 2009

JOHN DOLL
*Acting Director of the United States Patent and Trademark Office*